(12) United States Patent
Yu

(10) Patent No.: US 7,551,097 B2
(45) Date of Patent: Jun. 23, 2009

(54) INDICATOR DEVICE FOR MACHINE

(75) Inventor: Shih-Pin Yu, Changhua County (TW)

(73) Assignee: Barload Machine Co., Ltd., Changhua County (TW)

( * ) Notice: Subject to any disclaimer, the term of this patent is extended or adjusted under 35 U.S.C. 154(b) by 216 days.

(21) Appl. No.: 11/450,380

(22) Filed: Jun. 12, 2006

(65) Prior Publication Data
US 2007/0080822 A1 Apr. 12, 2007

(30) Foreign Application Priority Data
Oct. 11, 2005 (TW) ............................... 94135429 A

(51) Int. Cl.
G08B 21/00 (2006.01)

(52) U.S. Cl. ............... 340/635; 340/679; 340/691.1; 340/815.45

(58) Field of Classification Search ............... 340/635, 340/679, 680, 686.1, 686.4, 686.5, 691.1, 340/691.6, 691.7, 815.4, 815.42, 815.45, 340/3.1, 3.7
See application file for complete search history.

(56) References Cited

U.S. PATENT DOCUMENTS

| 3,944,799 | A | 3/1976 | Brownell |
| 4,157,231 | A | 6/1979 | Phillips |
| 4,379,415 | A | 4/1983 | Klancnik et al. |
| 4,396,976 | A | 8/1983 | Hyatt |
| 4,835,468 | A | 5/1989 | Dumbser et al. |
| 4,998,455 | A | 3/1991 | Jauch |
| 6,297,742 | B1 * | 10/2001 | Canada et al. ............... 340/635 |
| 7,119,704 | B2 * | 10/2006 | Grzan et al. ................. 340/665 |
| 7,310,049 | B2 * | 12/2007 | Bowman ..................... 340/664 |
| 2007/0152842 | A1 * | 7/2007 | Fayfield .................. 340/815.45 |

* cited by examiner

Primary Examiner—Toan N Pham
(74) Attorney, Agent, or Firm—Browdy and Neimark, P.L.L.C.

(57) ABSTRACT

An indicator device is used in a machine for indicating the operation status of the machine. The indicator device includes a body detachably mounted to the machine, a plurality of circuit boards, which are detachably electrically coupled together, mounted inside the body and each provided with a plurality of light emitting elements arranged in a line, and a controller electrically connected to the circuit boards for controlling on/off status of the light emitting elements subject to the operation status of the machine.

5 Claims, 5 Drawing Sheets

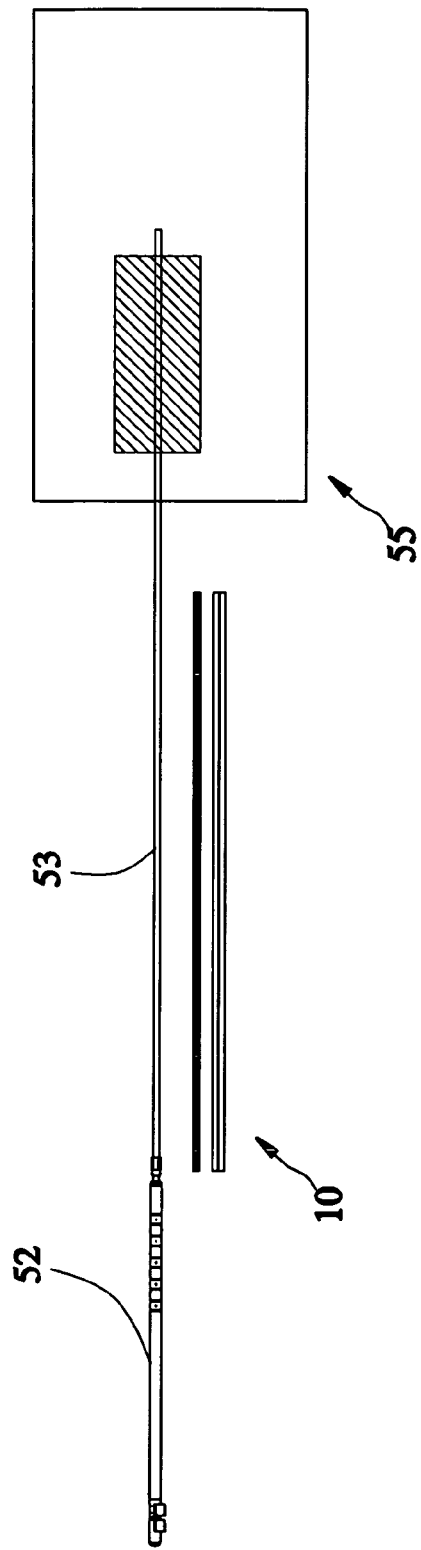
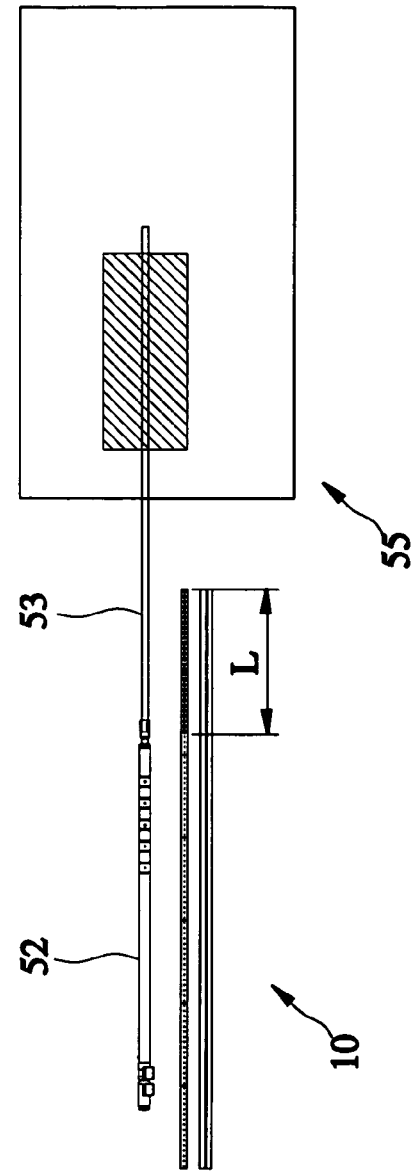
FIG. 4
FIG. 5

INDICATOR DEVICE FOR MACHINE

BACKGROUND OF THE INVENTION

1. Field of the Invention

The present invention relates to an indicator device and more particularly, to an indicator device for use in a machine to indicate the operation status of the machine.

2. Description of the Related Art

When using a computer numerically controlled (CNC) processing machine to perform a processing process, a material feeding machine may be used to feed the material, for example, a bar into the CNC processing machine for processing. The material feeding machine automatically feeds the material into the CNC processing machine for processing. This fully automatic processing process saves much labor.

A regular material feeding machine for use with a CNC processing machine is known comprising a machine base, a feeder tube adapted to carry the bar material to be processed, and a push rod mounted in the feeder tube and adapted to push the bar material out of the feeder tube into the CNC processing machine for processing. When the push rod of the material feeding machine is continuously pushing the bar material forwards, the operator cannot observe the feeding status of the bar material from the outside of the material feeding machine. If the material feeding machine fails or the push rod cannot push the bar material forwards, the operator cannot quickly find out the problem. When several feeding machines are operated at the same time, many operators are needed to keep normal operation of the feeding machines, thereby increasing much the labor cost.

SUMMARY OF THE INVENTION

The present invention has been accomplished under the circumstances in view. It is one object of the main object of the present invention to provide an indicator device for use in a machine, which enables the user to directly and rapidly recognize the feeding status of the material in the machine.

To achieve this object of the present invention, the indicator device is installed in a machine for indicating the operation status of the machine. The indicator device comprises a body, at least one circuit board, and a controller. The body is detachably mounted to the machine. The at least one circuit board is mounted in the body and each provided with at least one light emitting element. The controller is electrically connected to the at least one circuit board for controlling on/off status of the at least one light emitting element of the circuit board so as to provide a visual indication signal to the user subject to the operation status of the machine.

In a preferred embodiment of the present invention, the indicator device comprises a plurality of the circuit boards which are detachably electrically interconnected.

BRIEF DESCRIPTION OF THE DRAWINGS

FIG. 4 is a schematic drawing showing an indication status of the indicator device before operation of the push rod of the material feeding machine.

FIG. 5 is a schematic drawing showing another indication status of the indicator device during the operation of the push rod of the material feeding machine.

DETAILED DESCRIPTION OF THE INVENTION

Figure 1:
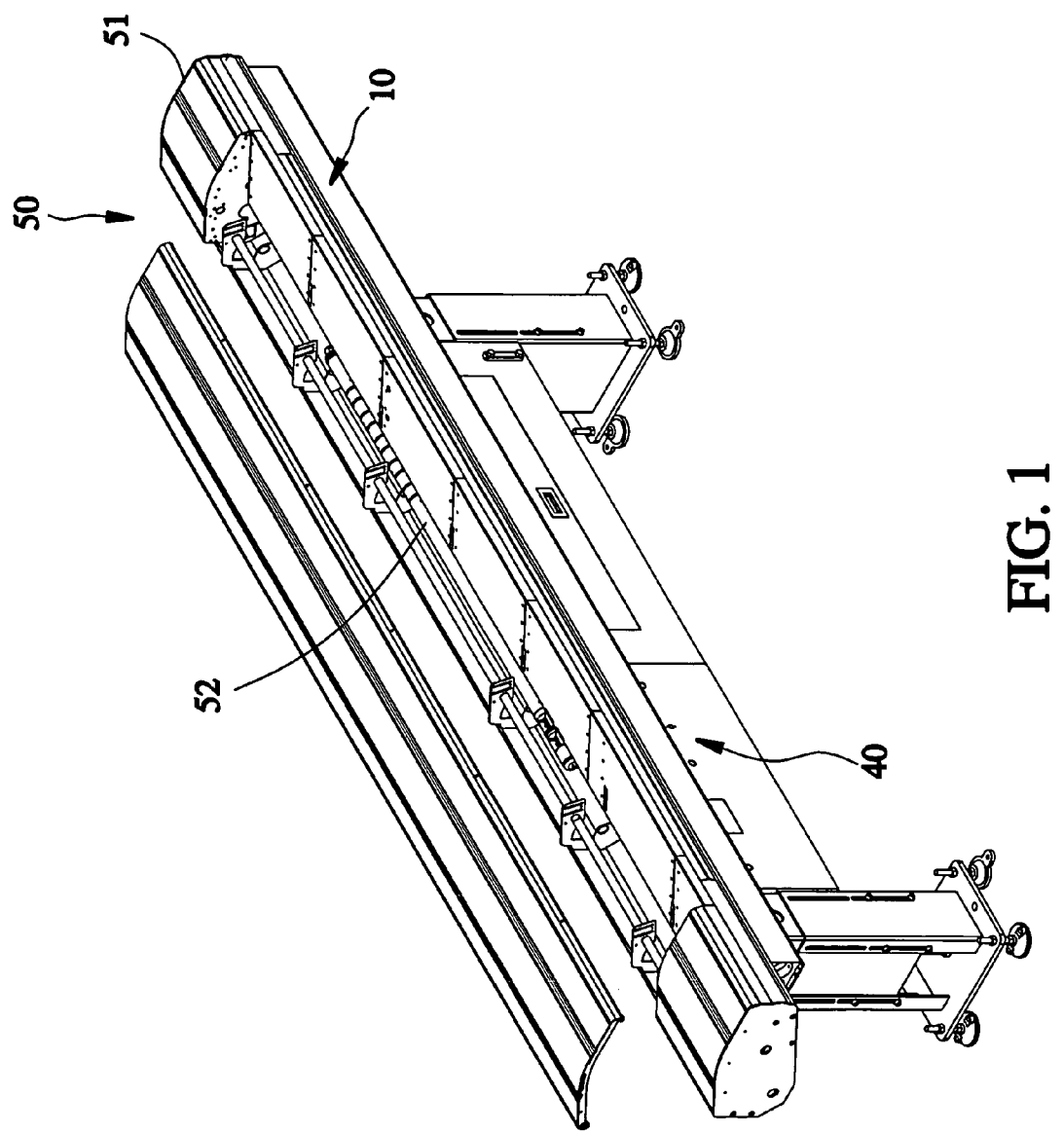
FIG. 1 is a perspective view showing an indicator device used in a material feeding machine.
Figure 2:
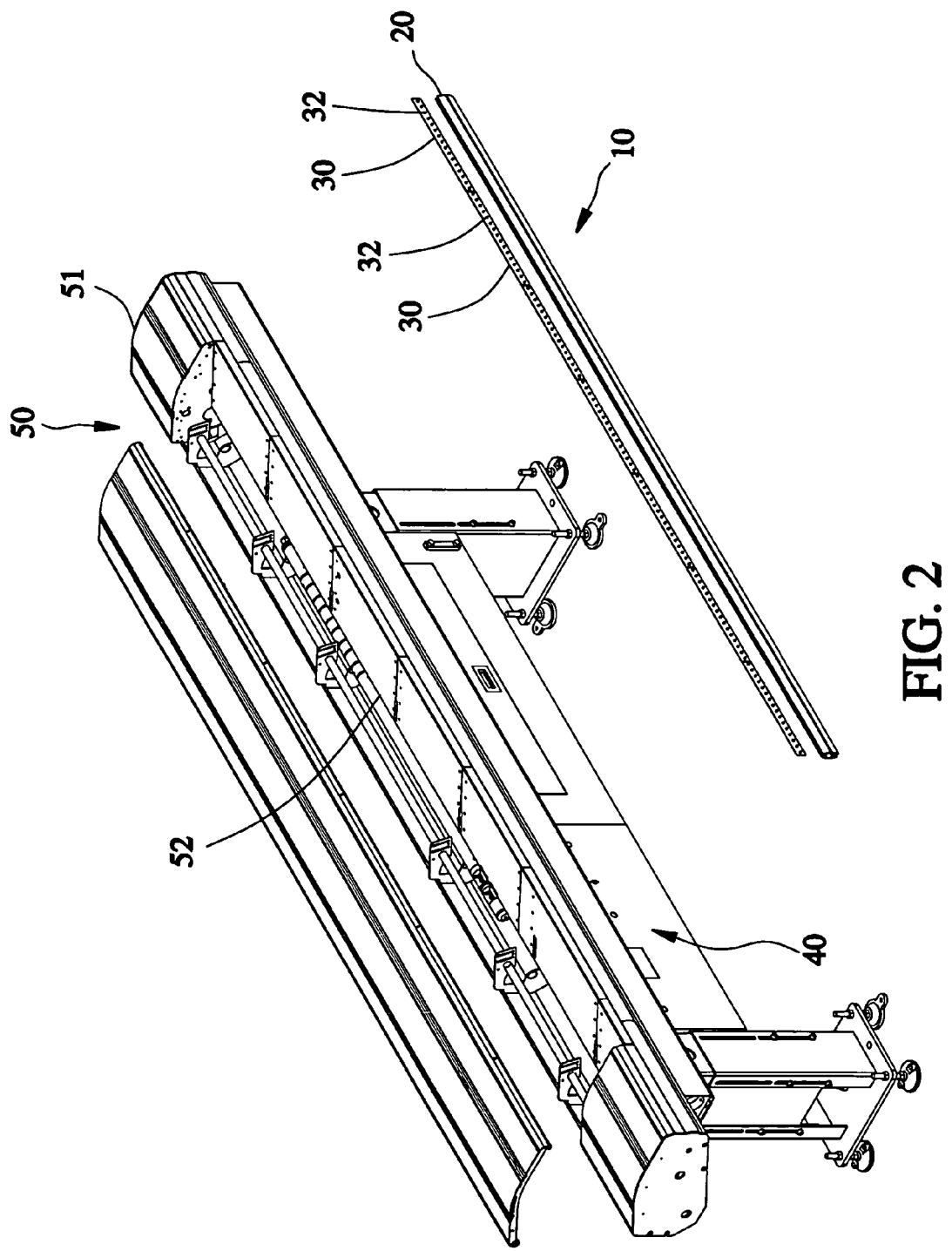
FIG. 2 is an exploded view of FIG. 1, showing the structure of the indicator device.
Figure 3:
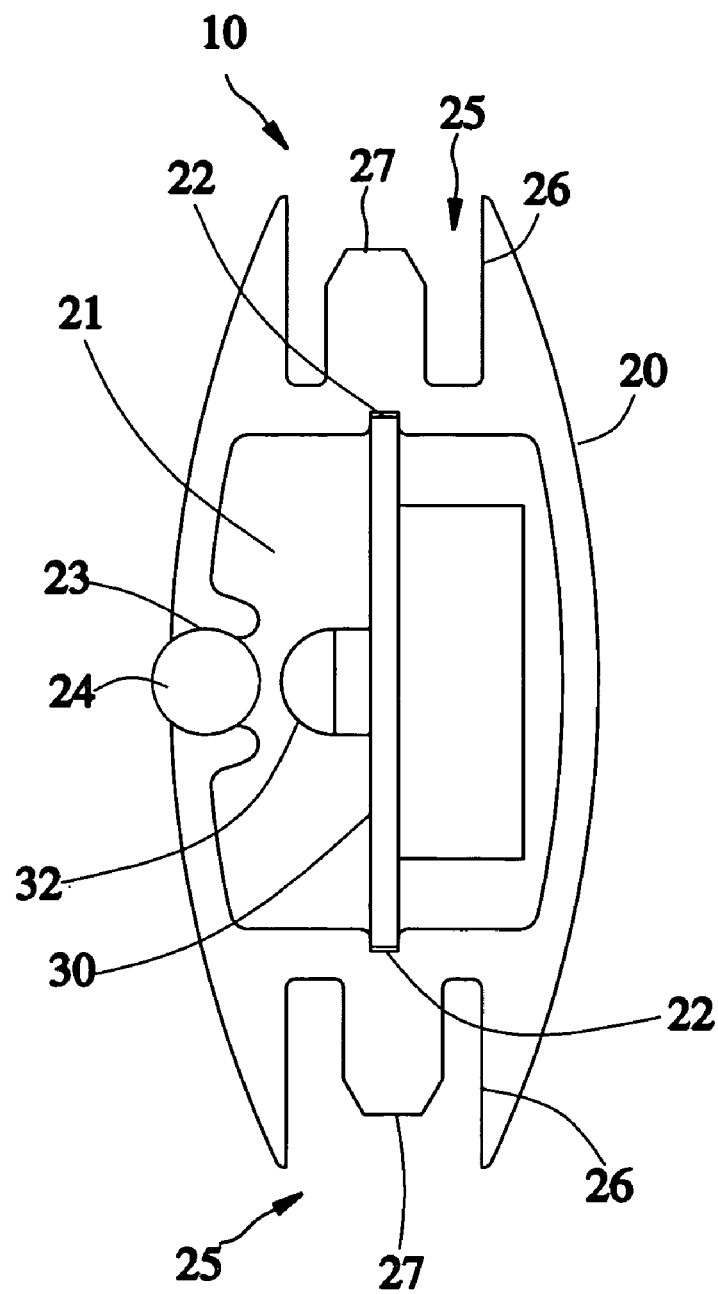
FIG. 3 is a cross-sectional view of the indictor device according to the present invention.

Referring to FIGS. 1-3, an indicator device 10 in accordance with the present invention is shown installed in a material feeding machine 50. The material feeding machine 50 according to the present preferred embodiment is a bar feeder, which comprises a machine base 51, and a push rod 52 mounted in the machine base 51. The indicator device 10 comprises a body 20, a plurality of circuit boards 30, and a controller 40.

As shown in FIG. 3, the body 20 is a narrow elongated member having an accommodation chamber 21 extending along the length, two mounting grooves 22 respectively disposed at the top and bottom sides inside the accommodation chamber 21, a locating slot 23 disposed at the front side in communication with the accommodation chamber 21, an acrylic light-transmissive member 24 fastened to the locating slot 23, and two mounting portions 25 respectively disposed at the top and bottom sides outside the accommodation chamber 21. Each mounting portion 25 has a recessed open chamber 26 and a rail 27 in the recessed open chamber 26. By means of the mounting portions 25, the body 20 is fastened to one lateral side of the machine base 51 and kept substantially in parallel to the push rod 52 with the light-transmissive member 24 facing toward the outside of the machine base 51.

Referring to FIGS. 1-3 again, the circuit boards 30 each have a plurality of light emitting elements 32 arranged in a line. According to the present preferred embodiment, the light emitting elements 32 are light emitting diodes (LEDs). The circuit boards 30 are arranged together and electrically connected together, and configured subject to the profile of the material feeding machine 50. The circuit boards 30 are mounted inside the accommodation chamber 21 of the body 20 and fastened to the mounting grooves 22, keeping the LEDs 32 aimed at the light-transmissive member 24 so that the light of the LEDs 32 passes through the light-transmissive member 24 to the outside.

The controller 40 is mounted in the machine base 51 and electrically connected to the circuit boards 30 for controlling on/off status of the LEDs 32 subject to the operation status of the material feeding machine 50.

Referring to FIG. 4, before operation of the push rod 52 of the material feeding machine 50 to push a bar material 53 into an automatic lathe 55, the controller 40 drives the circuit boards 30 to turn on all the LEDs 32, the length of the LEDs 32 that are all turned on is approximately equal to the length of the bar material 53. By means of the indication of the light of the LEDs 32, the user knows the length of the bar material 53 in the material feeding machine 50. When the push rod 52 is pushing the bar material 53 into the automatic lathe 55, the controller 40 controls on/off status of the LEDs 32 subject to the length of the bar material 53 that has been delivered into the automatic lathe 55 (see FIG. 5). Following the movement of the bar material 53 into the automatic lathe 55, the number of the LEDs 32 that are turned on is relatively reduced (see the region referenced by L in FIG. 5). Therefore, the user recognizes the inserted length of the bar material 53 in the automatic lathe 55 subject to the range of the LEDs 32 that are turned on.

Figure 6:
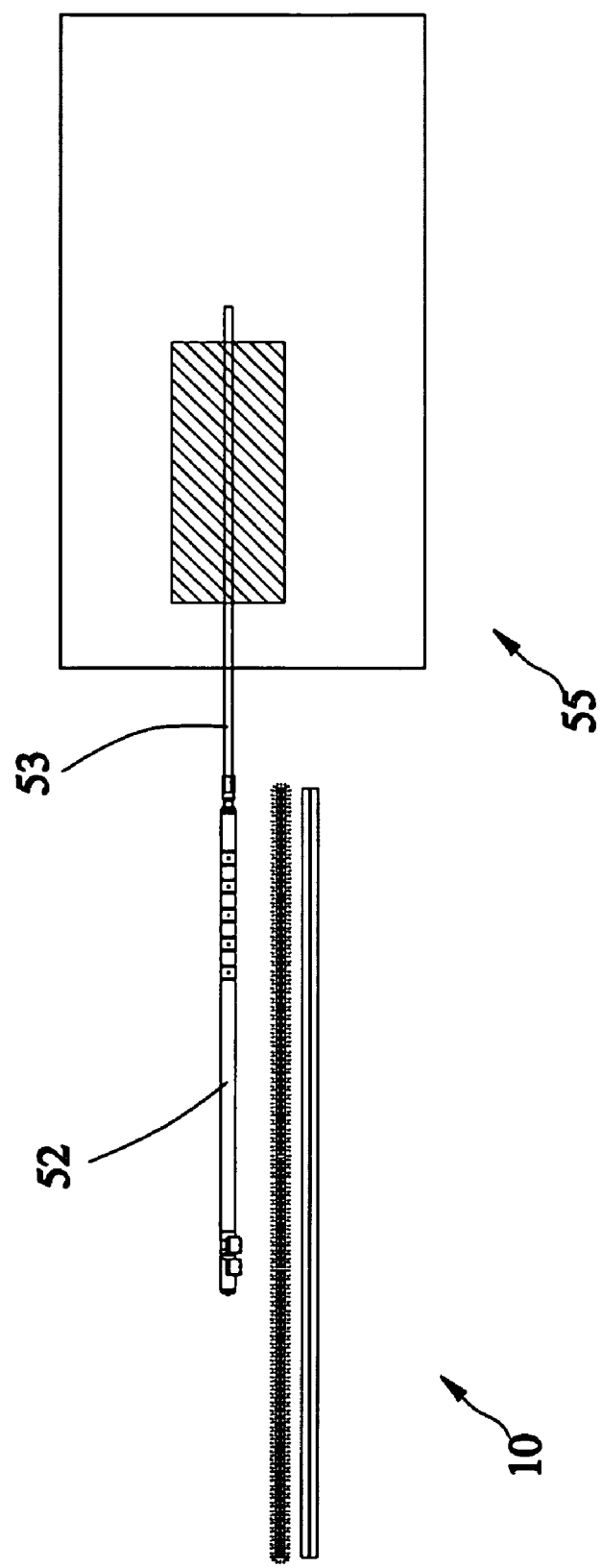
FIG. 6 is a schematic drawing showing still another indication status of the indicator device where the bar material has been completely delivered into the automatic lathe.

Referring to FIG. 6, when the push rod 52 pushed the bar material 53 completely into the inside of the automatic lathe 55, all the LEDs 32 are controlled to flash, imparting a visual signal to the user that the bar material 53 has been fully delivered into the automatic lathe 55. Further, when an abnormal condition occurred, for example, if the feeding of the bar material 53 is interrupted during the operation of the push rod 52 to push the bar material 53, the LEDs 32 are controlled to flash subject to a predetermined flashing mode, giving a visual feeding failure signal to the user.

As indicted above, the invention controls a number of light emitting elements to provide a visual indication signal subject to the bar material feeding status of the material feeding machine during operation of the automatic lathe. Therefore, the user can know directly and rapidly the feeding status of the bar material in the material feeding machine.

In the aforesaid preferred embodiment of the present invention, the indicator device is horizontally mounted in one lateral side of the machine base of the material feeding machine. Alternatively, the indicator device can be hung above or on the material feeding machine, keeping the light emitting elements arranged in line in vertical direction. Further, the controller can be separately mounted in the floor and electrically connected to the circuit boards. Further, in addition to the light emitting elements, speaker means may be used and controlled by the controller to output an audio signal indicative of the feeding status of the bar material.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An indicator device (10) installed in a material feeding machine (50) having a push rod (52) for pushing a bar material (53), for indicating the feeding status of the material feeding machine (50), wherein the indicator device (10) comprises:

a body (20) detachably mounted to said material feeding machine (50);

at least one circuit board (30) mounted in said body (20), wherein said at least one circuit board (30) has at least one light emitting element (32); and a controller (40) electrically connected to said at least one circuit board (30) for controlling on/off status of said at least one light emitting element (32) of said at least one circuit board (30) individually so as to provide a visual indication signal representing the feeding status of said material feeding machine (50), wherein said body (20) extends in a direction substantially parallel to the length of the push rod (52) of the material feeding machine (50), and said body (20) further comprises a light-transmissive member (24) corresponding in location to said at least one light emitting element (32) of said at least one circuit board (30).

2. The indicator device (10) as claimed in claim 1, wherein said body (20) has an accommodation chamber (21), which accommodates said at least one circuit board (30).

3. The indicator device (10) as claimed in claim 2, wherein said body (20) has two mounting grooves (22) respectively provided at top and bottom sides of an inner wall that defines said accommodation chamber (21); said at least one circuit board (30) has two sides respectively received in the mounting grooves (22) inside said body (20).

4. The indicator device (10) as claimed in claim 2, wherein said body (20) has a locating slot (23) disposed at one side thereof in communication with said accommodation chamber (21), and a light-transmissive member (24) fastened to said locating slot (23).

5. The indicator device (10) as claimed in claim 1, wherein said body (20) has at least one mounting portion (25) each having a recessed open chamber (26) and a rail (27) disposed in said recessed open chamber (26) for fastening to said material feeding machine (50).

* * * * *